(12) United States Patent
Lee et al.

(10) Patent No.: US 8,705,734 B2
(45) Date of Patent: Apr. 22, 2014

(54) METHOD AND SYSTEM FOR AUTHENTICATING A MOBILE TERMINAL IN A WIRELESS COMMUNICATION SYSTEM

(75) Inventors: Ji-Cheol Lee, Suwon-si (KR); Alper Yegin, Istanbul (TR)

(73) Assignee: Samsung Electronics Co., Ltd (KR)

( * ) Notice: Subject to any disclaimer, the term of this patent is extended or adjusted under 35 U.S.C. 154(b) by 667 days.

(21) Appl. No.: 12/957,946

(22) Filed: Dec. 1, 2010

(65) Prior Publication Data

US 2011/0129088 A1 Jun. 2, 2011

(30) Foreign Application Priority Data

Dec. 1, 2009 (KR) .................. 10-2009-0118092

(51) Int. Cl.
*H04L 9/00* (2006.01)
*H04L 9/32* (2006.01)
*H04L 9/08* (2006.01)

(52) U.S. Cl.
CPC .............. *H04L 9/321* (2013.01); *H04L 9/0869* (2013.01); *H04L 9/0891* (2013.01); *H04L 9/0838* (2013.01); *H04L 9/32* (2013.01); *H04L 9/3236* (2013.01); *H04L 9/3242* (2013.01); *H04L 9/3247* (2013.01); *H04L 9/3271* (2013.01); *H04L 2209/80* (2013.01)
USPC ......................................................... 380/44

(58) Field of Classification Search
CPC ... H04L 9/0869; H04L 9/0891; H04L 9/0838; H04L 9/32; H04L 9/321; H04L 9/3236; H04L 9/3271; H04L 9/3242; H04L 9/3247; H04L 9/3202; H04L 9/3223; H04L 9/3281; H04L 9/0813; H04L 2209/80
See application file for complete search history.

(56) References Cited

U.S. PATENT DOCUMENTS

| | | | |
|---|---|---|---|
| 8,245,039 B2 * | 8/2012 | Jones | 713/168 |
| 2005/0153684 A1 * | 7/2005 | Rodrigo | 455/411 |

(Continued)

OTHER PUBLICATIONS

Narayanan, V., Dondeti, L., EAP Extensions for EAP Re-authentication Protocol (ERP), Qualcomm, Inc., RFC 5296, IPCOM000174154D, Aug. 2008. Retrieved from <http://ip.com/IPCOM/000174154> on Jun. 28, 2013.*

(Continued)

*Primary Examiner* — Andrew Nalven
*Assistant Examiner* — Christopher Ruprecht
(74) *Attorney, Agent, or Firm* — The Farrell Law Firm, P.C.

(57) ABSTRACT

A method and system for authenticating in a wireless communication system. The system includes a Mobile Terminal (MT), an authenticator, and an Authentication, Authorization, Accounting (AAA) server. When the authenticator requests NAI information for authentication, the MT adds an authentication code to the NAI, and sends a response message including the NAI information to the authenticator. The authenticator relays the NAI to which the authentication code is added, to the AAA server. The AAA server extracts the authentication code from the NAI information, verifies the authentication of the MT, generates a new authentication key, and transmits the new authentication key to the authenticator.

26 Claims, 5 Drawing Sheets

(56) References Cited

U.S. PATENT DOCUMENTS

| | | | |
|---|---|---|---|
| 2005/0272466 A1* | 12/2005 | Haverinen et al. | 455/552.1 |
| 2006/0019635 A1* | 1/2006 | Ollila et al. | 455/411 |
| 2007/0060106 A1* | 3/2007 | Haverinen et al. | 455/410 |
| 2009/0217033 A1* | 8/2009 | Costa et al. | 713/155 |
| 2010/0017603 A1* | 1/2010 | Jones | 713/168 |
| 2010/0046467 A1* | 2/2010 | Chiou et al. | 370/331 |
| 2010/0323700 A1* | 12/2010 | Bachmann et al. | 455/436 |
| 2011/0002465 A1* | 1/2011 | Ahn et al. | 380/272 |
| 2012/0020343 A1* | 1/2012 | Sugizaki et al. | 370/338 |

OTHER PUBLICATIONS

Marin, R., Garcia, P., Gomez Skarmeta, A.F.; "Cryptographic Identity Based Solution for Fast Handover one EAP Wireless Networks"; Proceedings of the 9th International Conference on Mobile and Wireless Communications Networks, Cork, Ireland, Sep. 19-21, 2007.*

* cited by examiner

METHOD AND SYSTEM FOR AUTHENTICATING A MOBILE TERMINAL IN A WIRELESS COMMUNICATION SYSTEM

PRIORITY

This application claims priority under 35 U.S.C. §119(a) to a Korean Patent Application filed in the Korean Intellectual Property Office on Dec. 1, 2009 and assigned Serial No. 10-2009-0118092, the entire content of which is incorporated herein by reference.

BACKGROUND OF THE INVENTION

1. Field of the Invention

The present invention relates generally to a method and system for authenticating a Mobile Terminal (MT) in a communication system, and more particularly, to a method and system for minimizing message exchange during an MT reauthentication procedure following a handover in a wireless communication system.

2. Description of the Related Art

In various mobile wireless network architectures (e.g., Worldwide Interoperability for Microwave Access (WiMAX), 3rd Generation Partnership Project 2 (3GPP2), and Wireless Fidelity (WiFi)), Extensible Authentication Protocol (EAP) is used for the authentication of MTs for network access. EAP carries out a cryptographic authentication method between a subscriber, e.g., an MT, that wants to access the network and an authenticator in a subscriber's home domain (i.e., a network that the subscriber is registered to).

For example, EAP is executed between the MT and the subscriber's home Authentication, Authorization, and Accounting (AAA) server via the currently serving access network. The entity that resides in the access network and handles the forwarding of EAP packets between the MT and the home AAA server is called an authenticator. Typically, the authenticator is co-located with an access gateway (e.g., an Access Service Network GateWay (ASN GW) in WiMAX, and an access controller in WiFi).

Figure 1:
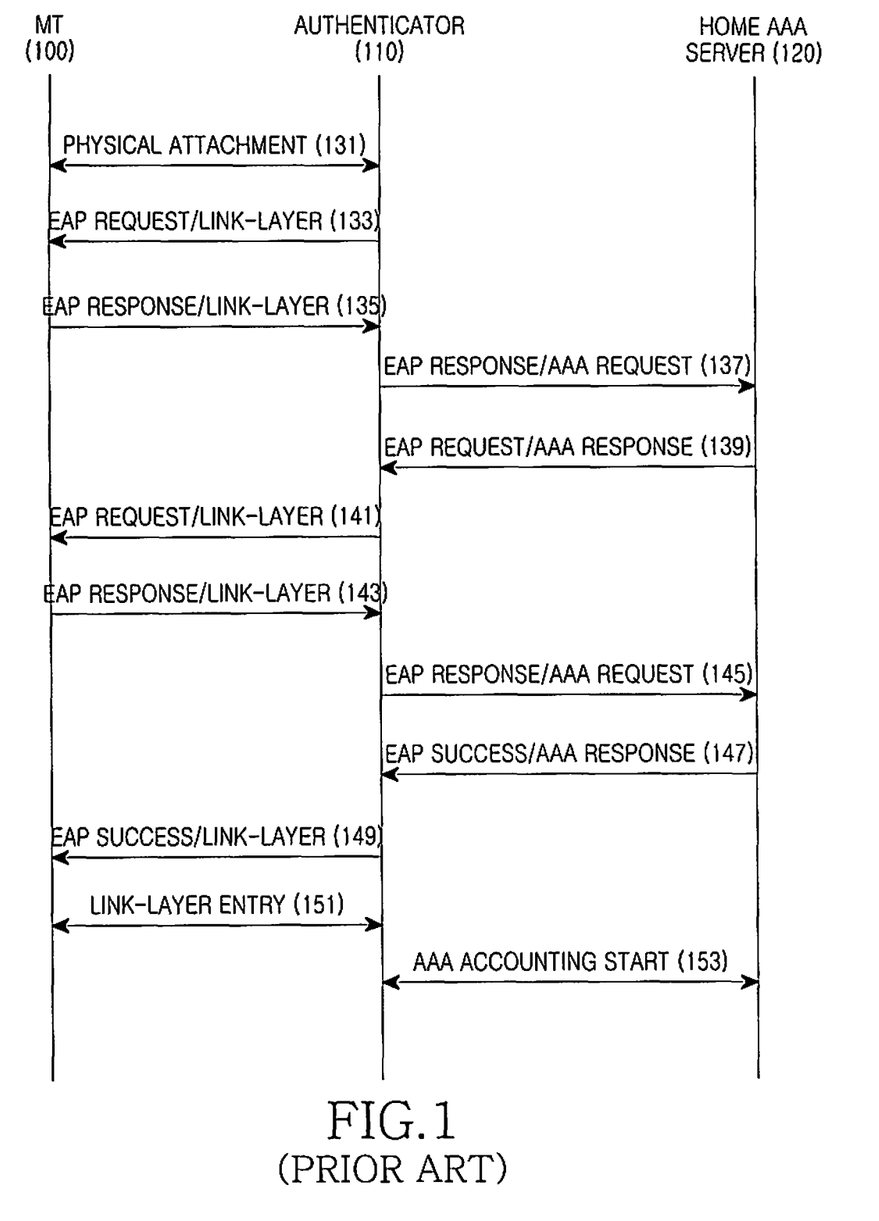
FIG. 1 is a ladder diagram illustrating a conventional procedure of authenticating a Mobile Terminal (MT) in a wireless communication system.

FIG. 1 illustrates a call flow for an MT performing EAP authentication during network entry in a wireless communication system according to the conventional art. Here, EAP represents a protocol for encapsulating and transmitting an authentication method for real authentication, such as Message Digest number 5 (MD5), Transport Layer Security (TLS), Secure Remote Password (SRP), etc.

Referring to FIG. 1, an MT 100 completes a physical layer attachment with an authenticator 110 in step 131, and then initiates a link-layer entry procedure with the authenticator 110. In step 133, the authenticator 110 transmits an EAP request message (EAP Request/Link-layer) for requesting identity information for the authentication of the MT 100, to the MT 100. The MT 100 and the authenticator 110 exchange a signal through a Base Station (BS) located between the MT 100 and the authenticator 110. Here, the EAP Request/Link-layer is defined as PKMv2 PKM-REQ/EAP-Transfer in the Institute of Electrical and Electronics Engineers (IEEE) 802.16 standards.

In step 135, the MT 100 sends the authenticator 110 an EAP response message (EAP Response/Link-Layer) including its own identity information, in response to the EAP Request/Link-layer. Here, the EAP Response/Link-Layer is defined as PKM-RSP/EAP-Transfer in the IEEE 802.16 standards.

In step 137, the authenticator 110 includes information of the EAP Response/Link-Layer in an AAA request message (EAP Response/AAA Request) and sends the EAP Response/AAA Request to a home AAA server 120.

The home AAA server 120 determines an EAP authentication method using identity information of the MT 100 identified through the EAP Response/AAA Request. Thereafter, in steps 139 and 141, the home AAA server 120 transmits the determined EAP authentication method information to the MT 100 via the authenticator 110, through an EAP Request/AAA Response and an EAP Request/Link-layer.

The MT 100 identifies the EAP authentication method determined by the AAA home server 120, through the EAP Request/Link-layer received from the authenticator 110. In steps 143 and 145, the MT 100 transmits information necessary for the EAP authentication method to the AAA home server 120 via the authenticator 110, through an EAP Response/Link-layer and an EAP Response/AAA Request. In steps 139 to 145, in preparation for packet loss, the AAA home server 120, the authenticator 110, and the MT 100 repeatedly perform transmission/reception of the EAP authentication method information and the information necessary for the EAP authentication method.

The AAA home server 120 identifies the authentication or non-authentication of the MT 100 using the information of the MT 100 necessary for the EAP authentication method included in the EAP Response/AAA Request received from the authenticator 110. If the AAA home server 120 can authenticate the MT 100, in steps 147 and 149, the AAA home server 120 transmits an authentication success message to the MT 100 via the authenticator 110, through an EAP Success/AAA Response and an EAP Success/Link-layer.

Accordingly, the MT 100 completes link-layer attachment with the authenticator 110 in step 151. In step 153, when the MT 100 completes the link-layer attachment with the authenticator 110, the AAA home server 120 starts accounting for the authenticator 110.

The MT 100 authenticated by the AAA home server, through the aforementioned authentication procedure, achieves successful link-layer entry and receives a network service.

However, the call flow illustrated in FIG. 1 presents a time-consuming procedure that involves a good deal of messaging between the authenticator 110 and the AAA home server 120. Additionally, two Network Elements (NEs) may be very far away from each other. Further, the messaging in steps 139, 141, 143, and 145, between the authenticator 110 and the AAA home server 120, may be repeated several times. Consequently, a delay caused by the EAP authentication can be as great as two to three seconds. Because the EAP authentication delay is in the critical path of the network entry procedure, the EAP authentication delay can block the network entry of the MT 100.

Additionally, when the MT 100 performs a handover to another access network, the EAP authentication delay may be caused by the handover, affecting dropped calls, fixed video stream, etc., in the course of real-time data communication.

Thus, there is a need for a method and system for minimizing EAP authentication latency upon handover in a wireless communication system.

SUMMARY OF THE INVENTION

The present invention has been made to address at least the above problems and/or disadvantages and to provide at least the advantages described below. Accordingly, an aspect of the present invention is to provide an apparatus and system for reducing a time delay resulting from an authentication of a Mobile Terminal (MT) in a wireless communication system.

Another aspect of the present invention is to provide an apparatus and system for reducing a time delay resulting from an authentication of an MT, when an authenticator of the MT is relocated in a communication system.

Another aspect of the present invention is to provide an apparatus and system for reducing a time delay resulting from an authentication of an MT, without changing a function of an authenticator in a wireless communication system.

In accordance with an aspect of the present invention, a method for authenticating a Mobile Terminal (MT) in a wireless communication system is provided. The method includes, receiving, by the MT, a message requesting Network Access Identifier (NAI) information for authentication from an authenticator, when performing link attachment with a Base Station (BS), adding an authentication code to the NAI, transmitting a response message including the NAI to which the authentication code is added, to the authenticator, and generating a new authentication key using a hash function with an input of an existing authentication key and a random constant value, when receiving an authentication success message from the authenticator.

In accordance with another aspect of the present invention, a method for authenticating an MT by an Authentication, Authorization, Accounting (AAA) server in a wireless communication system is provided. The method includes receiving, by the AAA, NAI information to which an authentication code is added, from an authenticator, verifying authentication of the MT using the authentication code, generating a new authentication key using the authentication code after verifying the authentication of the MT, and transmitting the new authentication key to the authenticator.

In accordance with another aspect of the present invention, a system for authenticating an MT in a wireless communication system is provided. The system includes an MT, an authenticator, and an AAA server. When the authenticator requests NAI information for authentication, the MT adds an authentication code to the NAI, and sends a response message including the NAI information to the target authenticator. The authenticator relays the NAI to which the authentication code is added, to the AAA server. The AAA server extracts the authentication code from the NAI information to which the authentication code received from the authenticator is added, verifies the authentication of the MT, generates a new authentication key, and transmits the new authentication key to the authenticator.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Various embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described below, which are defined considering functions in the present invention, can be different depending on user and operator intentions or practices. Therefore, the terms should be defined on the basis of the disclosure throughout the specification.

The following description is directed to a technology for reducing a delay resulting from Extensible Authentication Protocol (EAP) authentication when performing authentication through an authenticator, which has changed upon a handover in a wireless communication system.

In the following description, an authenticator receiving a link-layer entry request relays a signed Network Access Identifier (NAI) that a Mobile Terminal (MT) transmits through an EAP message, to an Authentication, Authorization, and Accounting (AAA) server. The AAA server and the MT generate the same Master Session Key (MSK) and Extended Master Session Key (EMSK) from each other, respectively.

Figure 2:
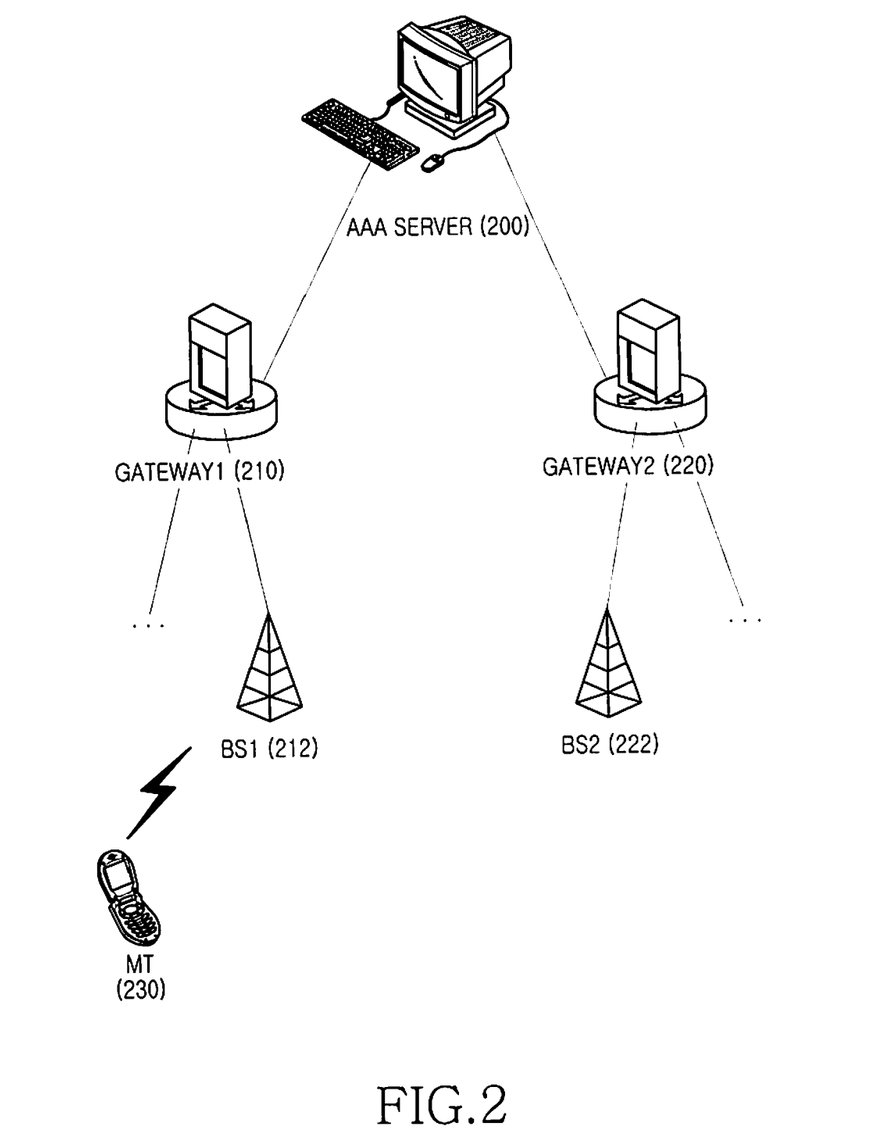
FIG. 2 illustrates a wireless communication system according to an embodiment of the present invention.

FIG. 2 illustrates a wireless communication system according to an embodiment of the present invention.

As illustrated in FIG. 2, the wireless communication system includes an AAA server 200, access gateways, i.e., gateway1 210 and grateway2 220, Base Stations (BSs), i.e., BS1 212 and BS2 222, and an MT 230. The access gateways 210 and 220 include authenticators (not shown) for authenticating the MT 230.

When the MT 230 accesses the BS1 212, the MT 230 performs an authentication procedure with the AAA server 200 through the gateway1 210. That is, the MT 230 and the AAA server 200 perform the authentication procedure through an authenticator 1 (not shown) included in the gateway1 210. For example, when the MT 230 initially accesses the BS1 212, the MT 230 and the AAA server 200 perform EAP authentication through the authenticator 1, as illustrated in FIG. 1 and described above.

However, when the MT 230 authenticated by the AAA server 200 then moves to a service area of the BS2 222, the gateway providing service to the MT 230 changes to the gateway2 220. Accordingly, the MT 230 generates a signed Network Access Identifier (NAI) and transmits the signed NAI to the authenticator2 (not shown) in the gateway2 220, using an EAP message. The authenticator 2 relays the received EAP message including the signed NAI to the AAA server 200, without a separate process. Accordingly, the MT 230 and the AAA server 200 may each use information of the signed NAI, which is made using the same MSK and EMSK.

Figure 3:
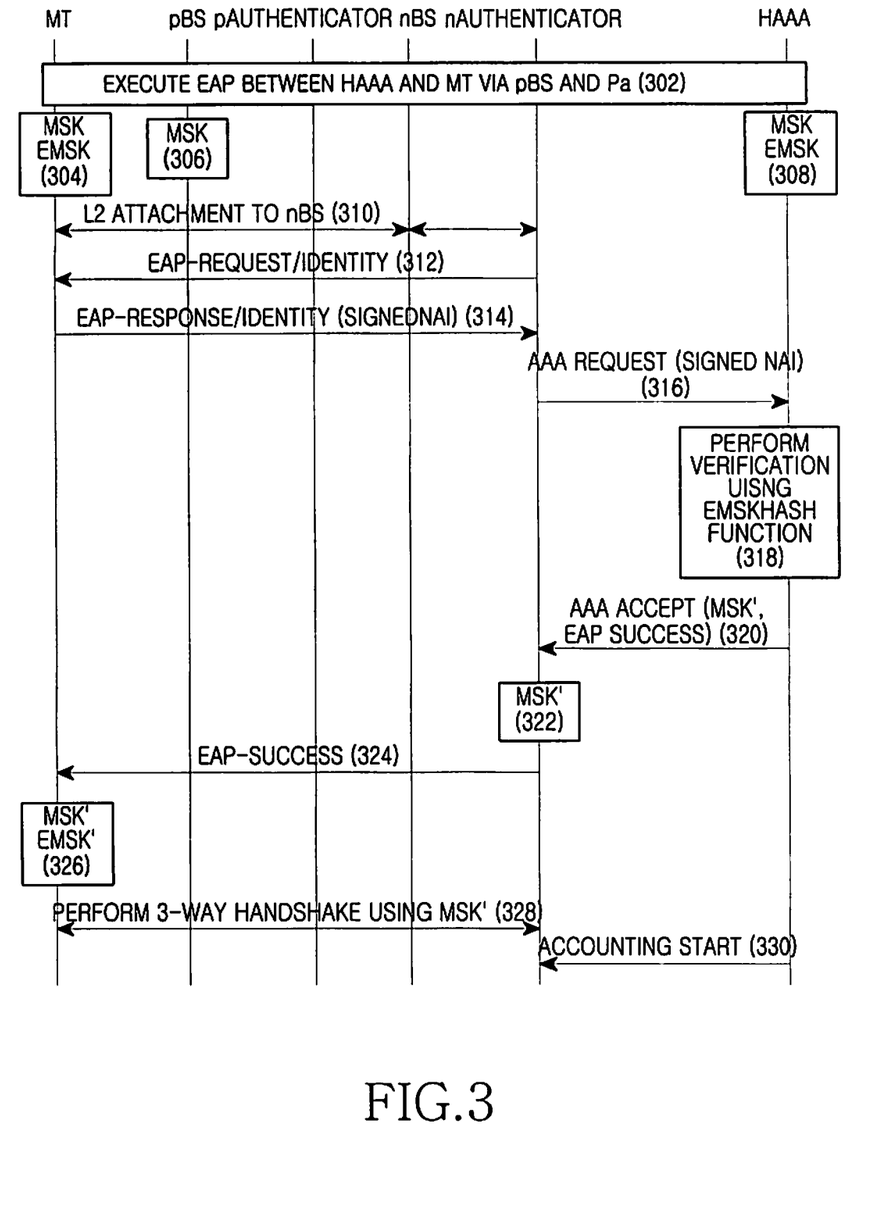
FIG. 3 is a ladder diagram illustrating a procedure for authenticating an MT in an authenticator according to an embodiment of the present invention.

FIG. 3 is a ladder diagram illustrating a procedure for authenticating an MT in an authenticator according to an embodiment of the present invention.

Referring to FIG. 3, in step 302, an MT is attached to an access network through a previous Base Station (pBS) whose Authenticator is a previous Authenticator (pA). Accordingly, the MT has already performed EAP authentication with a home AAA (HAAA) server via the pA. That is, the MT and the home AAA server each have an MSK for the cryptographic EAP session key and an EMSK that is derived from the MSK, in steps 304 and 308. Also, the pBS has an MSK in step 306.

In step 310, when the MT attempts a handover to another access network, the MT executes physical-layer attachment and initiates a link-layer entry procedure. Here, it is considered that an Authenticator used in another access network is a new Authenticator (nA).

In step 312, the nA initiates EAP-based access authentication by sending a standard EAP-Request/Identity message to the MT.

In accordance with an embodiment of the present invention, a standard MT that does not implement a new scheme responds to the EAP request with an EAP-Response/Identity message carrying its regular NAI. The regular NAI is defined as a form of use@realm, etc.

Additionally, an enhanced MT that implements this new scheme responds with an EAP-Response/Identity message carrying its signed NAI in step 314. The signed NAI includes a signature that enables the home AAA server to authenticate the MT, without executing an EAP method (e.g., EAP-Transport Layer Security (EAP-TLS), Extensible Authentication Protocol Method for UMTS Authentication and Key Agreement (EAP-AKA), etc.). The format of the signed NAI is given as in Equation (1) below:

$$\{ac=\text{ASCII print of Nonce1–ASCII print of Nonce2–}\\ \text{ASCII print of}\\ \text{EMSKhash}\}\text{username@homerealm} \quad (1)$$

As shown in Equation (1), the signed NAI is a decorated NAI that includes a decoration called "ac" that carries an authentication code. That decoration is followed by username and homerealm portions of a standard NAI.

Specifically, the "ac" decoration consists of three parts separated by hyphens (–).

The Nonce1 and Nonce2 values are numbers that are generated by the MT. The Nonce1 is a monotonically-increasing number. That is, the Nonce1 increases by a predetermined value (e.g., '1') more than a previously used Nonce1 whenever performing an EAP authentication procedure. The Nonce2 is a randomly-generated number. The Nonce1 and Nonce2 are used for replay protection, which prevents an unauthorized attacker from capturing encrypted data such as an electronic signature for use at a later time, disguised as a legal user. The signed NAI includes the ASCII print of those numbers, rather than their binary representations (which cannot be accommodated in a standard NAI format).

The EMSKhash is the one-way hash of EMSK. The EMSKhash is used by an MT to prove to the home AAA server that the MT does really hold the EMSK and it is authentic. The EMSKhash is computed by the MT according to Equation (2) below:

$$\text{EMSKhash}=\text{hash}(\text{EMSK},\text{Nonce1}) \quad (2)$$

That is, the EMSKhash is a hash value generated by a hash function with an input of the held EMSK and the generated Nonce1.

Similarly to the Nonce representation, the ASCII print of the EMSKhash is used in the NAI, not the binary format. The hash is any one-way cryptographic hash function. For example, the hash function is Hash-based Message Authentication Code (HMAC) using the SHA256 (HMAC-SHA256). Implementations of this scheme can choose any hash function as long as the hash function is used as the same function on both the MT and the home AAA server. The MT uses the last unexpired EMSK for the computation.

An example of the signed NAI is given below:
{ac=63456-23449-
23498725108723450872349852349892734​58925
578654}joe@hnsp.com When the nA receives the EAP-Response/Identity message in step 314, the nA relays the EAP-Response/Identity message to the home AAA server over a home AAA request message in step 316. The nA does not have to process the EAP-Response/Identity message in any special way, compared to the standard procedures.

When the home AAA server receives the AAA request message from the nA in step 316, if the home AAA server is a standard one that does not implement the new scheme, the home AAA server may not recognize the "ac" decoration and ignores the "ac" decoration. For example, the home AAA server recognizes the standard portions of the NAI, and follows the standard procedure by executing an appropriate EAP method (e.g., EAP-TLS, EAP-AKA, etc.)

In step 318, an enhanced home AAA server that implements the new scheme parses the "ac" decoration to verify the EMSKhash. For this verification, generating the EMSKhash, as shown in Equation (2), is used. Because the home AAA server knows the EMSK as well, it can check if the sender of the NAI also holds the same value by verifying the EMSKhash.

The home AAA server ensures the Nonce1 value is a new one. For that purpose, the home AAA server stores the previously used Nonce1 value to make sure the next Nonce1 value is greater than the previous one throughout the lifetime of an MSK or EMSK. If the home AAA server receives a Nonce1 value smaller than or equal to the previously used one, then it concludes that the verification has failed. Subsequently received Nonce1 values do not have to immediately follow each other, as some intermediate values are lost in transmission. That is, when a replay attack occurs by an intruder, the home AAA server performs a conventional EAP authentication procedure (i.e., an EAP authentication procedure of FIG. 1). Also, when the MSK or EMSK expires or when the Nonce1 reaches the maximum possible value, the home AAA server performs the conventional EAP authentication procedure of FIG. 1 or replaces the stored Nonce1 value with the new one.

Here, the initial Nonce1 value generated in the MT is set greater than the initial Nonce1 to the home AAA server. That is, when the Nonce1 reaches the maximum possible value or when the MSK or EMSK expires, the home AAA server stores a fresh Nonce1 to prevent a future replay attack. When a currently received Nonce1 value is greater than a previous Nonce1 value, the currently received Nonce1 value becomes the fresh Nonce1 value. The home AAA server performs the conventional EAP authentication procedure of FIG. 1.

If the EMSKhash verification fails, the home AAA server falls back to following the standard procedure by executing an appropriate EAP method (e.g., EAP-TLS, EAP-AKA, etc.) (not shown).

If the EMSKhash verification succeeds, the home AAA server computes new MSK' and EMSK' values to be used according to Equation (3) below:

$$\text{MSK}'=\text{hash}(\text{MSK},\text{Nonce2})$$

$$\text{EMSK}'=\text{hash}(\text{EMSK},\text{Nonce2}) \quad (3)$$

The MSK' is determined as a hash value of a hash function with an input of the existing MSK of step 308 and the Nonce2 value received from the MT. The EMSK' is determined as a hash value of a hash function with an input of the existing EMSK of step 308 and the Nonce2 value received from the MT.

In accordance with another embodiment of the present invention, the home AAA server may generate another input variable, for example, an MSK' in place of the Nonce2, using information (e.g., NAI, MT identifier, MAC address, username, homerealm, network address, label information (i.e., a context accompanied with " " before MSK'), and the like) already known between the MT and the home AAA server. Alternatively, the home AAA server can generate an MSK' with an additional input value of the information already known between the MT and the home AAA server, besides the MSK and the Nonce2. Similarly, even the EMSK' can use another input variable in place of the Nonce2 or with an additional input value.

Here, the hash is any one-way cryptographic hash function. For example, the hash is HMAC-SHA256. Implementations of this scheme of the present invention can choose any hash function as long as the hash function is used as the same function on both the MT and the home AAA server.

In step 320, the home AAA server generates an AAA accept message and delivers both an EAP-Success message and the MSK' to the nA.

In step 322, the nA processes the incoming AAA message, recognizing the successful result, and stores the newly-received MSK'. In step 324, the nA relays the EAP-Success message to the MT.

Receipt of the EAP-Success message immediately after sending the EAP-Response/Identity message indicates successful execution of this scheme of the present invention to the MT. Accordingly, in step 326, the MT executes the aforementioned Equation (3) for computing the MSK' and EMSK' values.

If the MT receives an EAP method request, then it concludes the new scheme is not being followed. In this case, the MT follows the standard EAP method execution procedure.

In step 328, the AAA procedure continues with a 3-way handshake, and in step 330, the accounting procedure starts.

Figure 4:
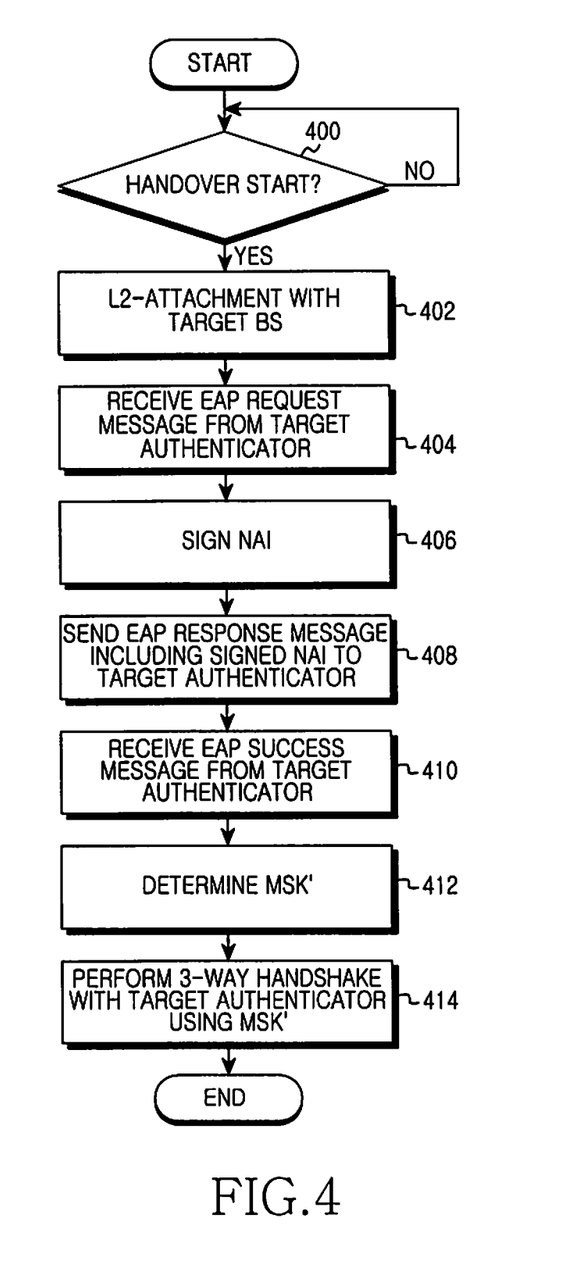
FIG. 4 is a flow diagram illustrating a procedure for relocating an authenticator of an MT in an Authentication, Authorization, and Accounting (AAA) server according to an embodiment of the present invention.

FIG. 4 is a flow diagram illustrating an operation of an MT for performing fast authentication in a wireless communication system, according to an embodiment of the present invention.

Referring to FIG. 4, when the MT performs a handover to another access network in step 400, the MT performs physical-layer attachment with a target BS in step 402, starting a link-layer entry procedure. Here, it is assumed that the MT has been attached to a serving access network through a serving BS before performing the handover to another access network, and has performed EAP authentication with an AAA server and holds an MSK that is a cryptographic EAP session key and an EMSK that derives from the MSK.

In step 404, the MT receives an EAP request message from a target authenticator and, in step 406, signs an NAI. That is, the conventional NAI includes an authentication code for authenticating the MT in the AAA server. For example, a format of the signed NAI is given in Equation (1) above.

As described above, the authentication code ("ac") includes Nonce1, Nonce2, and EMSKhash. The Nonce1 is a monotonically-increasing number (its implementations can use a number decreasing, not increasing from the maximum value). The Nonce2 is a randomly-generated number. The EMSKhash is the one-way hash of the EMSK, and it is used by the MT to prove to the home AAA server that the MT does really hold the EMSK and it is authentic. The EMSKhash is a hash value generated by a hash function with an input of the held EMSK and the generated Nonce1, as given in Equation (2) above.

In step 408, the MT sends an EAP response message including the signed NAI to the target authenticator and, in step 410, receives an EAP success message from the target authenticator.

In step 412, when the MT receives the EAP success message, the MT generates a new MSK' using the existing unexpired MSK and the existing generated Nonnce2, as shown in Equation (3) above.

In step 414, the MT performs a 3-way handshake with the target authenticator using the MSK'. Even the target authenticator holds the MSK' received from the AAA server. The MSK' determined in the MT is the same as the MSK' held by the target authenticator.

Figure 5:
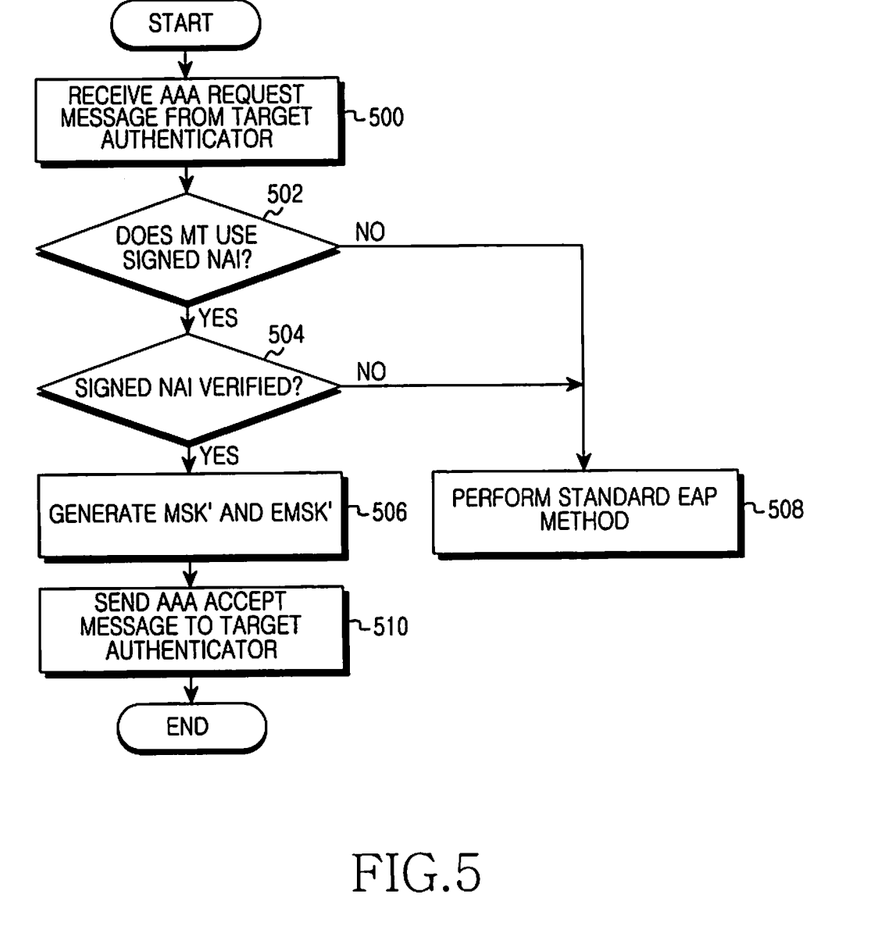
FIG. 5 is a flow diagram illustrating a procedure for relocating an authenticator of an MT in a wireless communication system according to an embodiment of the present invention.

FIG. 5 is a flow diagram illustrating an operation of an AAA server for performing fast authentication in a wireless communication system according to an embodiment of the present invention.

Referring to FIG. 5, when the AAA server receives an AAA request message from a target authenticator in step 500, in step 502, the AAA server determines if the MT uses a signed NAI for the AAA request message. When the signed NAI is not used, the AAA server performs authentication according to a standard EAP procedure in step 508.

However, when the signed NAI is used, in step 504, the AAA server identifies if the signed NAI has been verified. For example, the AAA server parses Nonce1, Nonce2, and EMSKhash information from the signed NAI, compares the parsed Nonce1 with a stored Nonce1, and verifies if there has been a replay attack. Also, the AAA server generates a hash value with an input of an unexpired EMSK and the parsed Nonce1 based on the same hash function as that of the MT, and compares if the hash value is the same as the parsed EMSKhash value, verifying the signed NAI.

After the signed NAI is verified, in step 506, the AAA server generates an MSK' and an EMSK'.

In step 510, the AAA server transmits an AAA accept message together with the generated MSK' to the target authenticator.

In the embodiments described above, it is assumed that a pA does not discard an authentication variable of an MT. However, when the pA discards the authentication variable of the MT, the pA may transmit an authenticator relocation failure signal to the authenticator having requested authenticator relocation.

As described above, the various embodiments of the present invention have an advantage of reducing a time delay resulting from EAP authentication, by enabling an AAA server to derive an MSK and EMSK to be used by an MT from a signed NAI transmitted by the MT in a wireless communication system.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for authenticating a Mobile Terminal (MT) in a wireless communication system, the method comprising:

receiving, by the MT, a message requesting Network Access Identifier (NAI) information for authentication of the MT, from an authenticator, when performing link attachment with a Base Station (BS);

adding, to the NAI, an authentication code including a monolithically increasing first constant, a randomly generated second constant, and a hash value generated by a hash function, the first constant, and an existing authentication key;

transmitting a response message including the NAI to which the authentication code is added, to the authenticator; and generating a new authentication key using the hash function, the existing authentication key, and the randomly generated second constant, when receiving an authentication success message from the authenticator.

2. The method of claim 1, wherein the monolithically increasing first constant is used for verifying the hash value, and the randomly generated second constant is used for generating the new authentication key.

3. The method of claim 1, wherein the first constant, the second constant, and the hash value are separated by hyphens.

4. The method of claim 1, wherein the new authentication key includes one of a Master Session Key (MSK) for a cryptographic Extensible Authentication Protocol (EAP) session key and an Extended Master Session Key (EMSK) that derives from the MSK.

5. The method of claim 1, further comprising performing a 3-way handshake with a target authenticator using the new authentication key.

6. The method of claim 1, further comprising performing a standard EAP procedure, when the authentication success message is not received from the authenticator.

7. The method of claim 1, further comprising generating the authentication code.

8. The method of claim 7, wherein generating the authentication code comprises:

generating a new first constant by increasing or decreasing an existing first constant value according to a predefined scheme;

randomly generating a second constant;

generating a hash value using the new first constant and the existing authentication key; and separating the new first constant, the second constant, and the hash value by hyphens.

9. A method for authenticating a Mobile Terminal (MT) by an Authentication, Authorization, Accounting (AAA) server in a wireless communication system, the method comprising:

receiving, by the AAA server, Network Access Identifier (NAI) information including an authentication code including a monolithically increasing first constant, a randomly generated second constant, and a hash value generated by a hash function, the first constant, and an existing authentication key, from an authenticator;

verifying authentication of the MT using the authentication code;

generating a new authentication key using the authentication code, when the authentication of the MT is verified; and transmitting the new authentication key to the authenticator.

10. The method of claim 9, wherein the monolithically increasing first constant is used for verifying the hash value, and the randomly generated second constant is used for generating the new authentication key.

11. The method of claim 9, wherein the new authentication key includes one of a Master Session Key (MSK) for a cryptographic Extensible Authentication Protocol (EAP) session key and an Extended Master Session Key (EMSK) that derives from the MSK.

12. The method of claim 9, wherein verifying the authentication of the MT using the authentication code comprises comparing the monolithically-increasing first constant of the authentication code with an existing stored first constant.

13. The method of claim 9, wherein verifying the authentication of the MT using the authentication code comprises:

extracting the monolithically-increasing first constant and the hash value from the authentication code;

generating a second hash value with the first constant and an existing authentication key; and comparing the extracted hash value with the second hash value.

14. The method of claim 13, further comprising storing the first constant value extracted from the authentication code.

15. The method of claim 13, further comprising resetting the first constant to an initial value, if the existing authentication key expires or if the first constant reaches a maximum value.

16. The method of claim 9, further comprising performing a standard EAP procedure, when the authentication of the MT is not verified.

17. A system for authenticating a Mobile Terminal (MT) in a wireless communication system, the system comprising:

an MT that receives a request for Network Access Identifier (NAI) information, adds, to the NAI information, an authentication code including a monolithically increasing first constant, a randomly generated second constant, and a hash value generated by a hash function, the first constant, and an existing authentication key, and sends a response message including the NAI information to which the authentication code is added;

an authenticator that transmits the request for the NAI information, receives the response message, and relays the NAI information to which the authentication code is added; and an Authentication, Authorization, Accounting (AAA) server that receives relayed NAI information to which the authentication code is added, extracts the authentication code from the NAI information, verifies the authentication of the MT, generates a new authentication key, and transmits the new authentication key to the authenticator.

18. The system of claim 17, wherein the monolithically increasing first constant is used for verifying the hash value, and the randomly generated second constant is used for generating the new authentication key.

19. The system of claim 17, wherein the new authentication key comprises one of:

a Master Session Key (MSK) for a cryptographic Extensible Authentication Protocol (EAP) session key; and an Extended Master Session Key (EMSK) that derives from the MSK.

20. The system of claim 17, wherein the MT generates a new authentication key using a hash function, an existing holding authentication key, and a random constant value, when the authentication succeeds.

21. The system of claim 17, wherein the MT performs a 3-way handshake with the authenticator using the new authentication key.

22. The system of claim 17, wherein the MT follows a standard EAP procedure, when the AAA server cannot verify the authentication of the MT.

23. The system of claim 17, wherein the AAA server compares the monolithically-increasing first constant of the authentication code with an existing stored first constant, and protects replay.

24. The system of claim 17, wherein the AAA server extracts the monolithically-increasing first constant and the hash value from the authentication code, generates a second hash value using the first constant and an existing authentication key, and compares the extracted hash value with the second hash value.

25. The system of claim 17, wherein the AAA server follows a standard EAP procedure, when the AAA server cannot verify the authentication of the MT.

26. The system of claim 17, wherein the MT generates a new first constant by increasing or decreasing an existing first constant value according to a predefined scheme, randomly generates a second constant, generates a hash value using the new first constant and authentication key, and separates the new first constant, the second constant, and the hash value by hyphens.

* * * * *